R. L. GORDON.
LENS.
APPLICATION FILED DEC. 1, 1916.
1,223,691.  Patented Apr. 24, 1917.
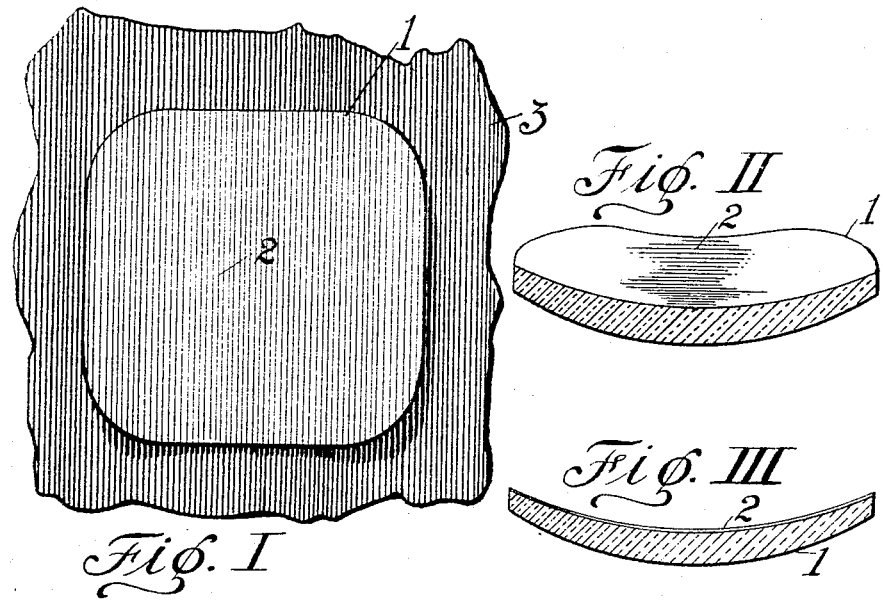
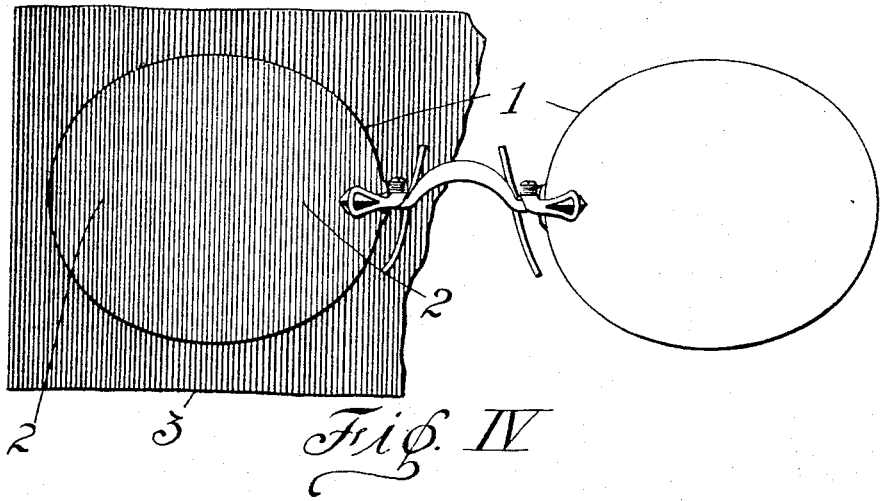
INVENTOR
Robert L. Gordon
BY
H. H. Styll, H. K. Parsons
ATTORNEYS

UNITED STATES PATENT OFFICE.

ROBERT L. GORDON, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS.

1,223,691.    Specification of Letters Patent.    Patented Apr. 24, 1917.

Application filed December 1, 1916. Serial No. 134,385.

*To all whom it may concern:*

Be it known that I, ROBERT L. GORDON, a citizen of the United States, residing at Southbridge, in the county of Worcester and State of Massachusetts, have invented certain new and useful Improvements in Lenses, of which the following is a specification.

My invention relates to improvements in lenses, and has particular reference to cylindrical lenses, that is to say, lenses whose powers in the two principal meridians are not equal.

One of the leading objects of the present invention is the provision of novel and improved means which may be employed both in connection with the partially finished lens and in connection with the finished lens as used by the wearer, which means shall serve to readily and exactly at all times designate the axis of cylindrical correction of the lens.

A further object of the present invention is the provision of a lens which shall be provided with a permanent designation thereon to enable the position of the lens in its mounting to be quickly and readily checked up at any desired time to determine whether the same is in correct position before the eye of the wearer.

Other objects and advantages of my improved construction should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a plan view of a lens blank mounted on a dark surface and provided with my improvement.

Fig. II represents a transverse sectional view of the lens.

Fig. III represents a sectional view at right angles to Fig. II.

Fig. IV represents a view of a mounting equipped with a pair of lenses constructed in accordance with my improvement.

In the drawings, the numeral 1 designates a lens which may be either a plain cylinder, toric, sphero cylinder, or the like, the essential being that the lens shall have a cylindrical value, that is to say, a greater power in one meridian than in another predetermined meridian.

Formed upon the cylinder surface is what may be termed an invisible axis line, extending entirely across the lens. I here employ the term invisible due to the fact that the line is so lightly marked on the surface of the lens as to be unnoticeable when looking through the lens or when looking at the lens, and capable of being found only by a person knowing that the line is present, and then particularly noticeable only in the event that the lens is placed upon a dark surface, such as the mat 3 for example, and the correct cross light gotten on the lens to cause the mark to show up. It is, of course, possible also to notice the line when the lens is held and tilted to obtain exact correct cross light, but this is accentuated by the use of the mat 3. It will be understood that these matters of detecting cross lines are for general service purposes only, since the line is originally applied by placing of the machine in a suitable axis finding machine, locating the exact correct axis by means of the machine, and while the lens is suitably held faintly etching, burnishing or forming the line 2 thereon, either by a diamond, spinning or otherwise, or by indicating the position to be occupied by the line, removing the lens, placing a protecting wax coating on the lens with a scratch, and slightly destroying the polish at this point, as by an acid, acting through the scratch in the coating.

In any event, however, the final result is the same, namely that a line is formed on the lens along the axis of the cylinder, which is indelibly imprinted upon the lens and at the same time imprinted in such manner as to be invisible for all practical purposes.

I claim:

1. A cylindrical lens, having an axis forming line invisibly marked on the surface thereof.

2. The combination with a lens having a cylindrical power, of an axis designation extending across the lens and permanently applied thereto but invisible as respects ordinary vision.

3. The combination with a cylinder lens, of a faint indentation formed thereon and extending along the axis of the cylinder.

In testimony whereof I affix my signature in the presence of two witnesses.

ROBERT L. GORDON.

Witnesses:
H. H. STYLL,
H. K. PARSONS.

Copies of this patent may be obtained for five cents each, by addressing the "Commissioner of Patents, Washington, D. C."